United States Patent
Dearing et al.

(10) Patent No.: US 10,521,839 B2
(45) Date of Patent: Dec. 31, 2019

(54) SYSTEM AND METHOD FOR FIND AND DELIVER SERVICE

(71) Applicant: United States Postal Service, Washington, DC (US)

(72) Inventors: Stephen M. Dearing, Herndon, VA (US); Carla F. Sherry, Annandale, VA (US)

(73) Assignee: United States Postal Service, Washington, DC (US)

( * ) Notice: Subject to any disclaimer, the term of this patent is extended or adjusted under 35 U.S.C. 154(b) by 1035 days.

(21) Appl. No.: 14/679,374

(22) Filed: Apr. 6, 2015

(65) Prior Publication Data

US 2015/0287113 A1    Oct. 8, 2015

Related U.S. Application Data

(60) Provisional application No. 61/976,986, filed on Apr. 8, 2014.

(51) Int. Cl.
*G06Q 30/06* (2012.01)
*G06Q 10/08* (2012.01)
*G06Q 30/02* (2012.01)

(52) U.S. Cl.
CPC ....... *G06Q 30/0611* (2013.01); *G06Q 10/083* (2013.01); *G06Q 30/0601* (2013.01)

(58) Field of Classification Search
USPC .......................................................... 706/26
See application file for complete search history.

(56) References Cited

U.S. PATENT DOCUMENTS 5,602,382 A * 2/1997 Ulvr .................... B07C 3/18
 235/375
7,647,231 B2 * 1/2010 Kuebert ................ G06Q 10/08
 705/1.1

(Continued)

FOREIGN PATENT DOCUMENTS

CN    1564176 A    1/2005
CN    1632814 A    6/2005

(Continued)

OTHER PUBLICATIONS

International Search Report and Written Opinion dated May 29, 2015 for International Patent Application No. PCT/US2015/024571 which corresponds to captioned U.S. Appl. No. 14/679,374, and cites the above-identified reference numbered 1.

*Primary Examiner* — Garcia Ade
(74) *Attorney, Agent, or Firm* — Knobbe Martens Olson & Bear LLP (57) ABSTRACT

This disclosure describes systems, methods and apparatus for finding and delivering a desired item, including unique or hard-to-find items. In one example, there is provided a method that includes receiving a request to find the item and broadcasting the request. The method includes receiving responses to the broadcasted request, the responses indicating a finding of the item and including a bid to sell the item. The method includes providing purchase options for the item to a source of the request based on the received responses, and receiving, from the source of the request, a selection of a purchase option from among the purchase options provided to the source. The method includes providing instructions to a provider of the selected purchase option based on the received selection.

8 Claims, 7 Drawing Sheets

(56) References Cited

U.S. PATENT DOCUMENTS

| | | | |
|---|---|---|---|
| 2005/0197892 A1 | 9/2005 | Bilibin et al. | |
| 2010/0174599 A1* | 7/2010 | Rosenblatt | G06Q 30/02 705/14.37 |
| 2013/0024326 A1* | 1/2013 | Dearing | G06Q 30/02 705/26.61 |

FOREIGN PATENT DOCUMENTS

| | | |
|---|---|---|
| CN | 101449509 A | 6/2009 |
| CN | 101595505 A | 12/2009 |
| CN | 102722836 A | 10/2012 |
| CN | 103295152 A | 9/2013 |
| CN | 103455900 A | 12/2013 |
| CN | 103605469 A | 2/2014 |

* cited by examiner

SYSTEM AND METHOD FOR FIND AND DELIVER SERVICE

INCORPORATION BY REFERENCE OF ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of U.S. Application No. 61/976,986, filed Apr. 8, 2014, the entire contents of which are herein incorporated by reference in their entirety.

FIELD

The present disclosure relates generally to product provision and more specifically to a system and method of finding and delivering a desired item, including a process for finding and/or creating unique or hard-to-find items.

BACKGROUND

Shoppers who try to locate hard-to-find or best-value items for purchase often spend much of their time visiting brick and mortar stores (e.g., retail stores, flea markets, yard sales, estate sales, specialty shops, etc.) and/or using the internet to search for such items. This can be a time consuming process for the shopper and may not connect the shopper with other parties (e.g., self-designated specialty searchers, shoppers, and/or middlemen) who would be willing to engage in the search process and provide a service to help with the search. Moreover, shoppers may not reach the largest audience of potential suppliers or sellers. Additionally, some shoppers who are trying to locate and purchase certain items may want to remain anonymous or want to be a virtual/anonymous purchaser, as opposed to a known or identifiable buyer. Also, a shopper may wish to pay for the desired item via a trust-worthy third-party who can ensure a high degree of anonymity for the shopper.

SUMMARY

Various implementations of systems, methods and devices within the scope of the appended claims each have several aspects, no single one of which is solely responsible for the desirable attributes described herein. Without limiting the scope of the appended claims, some prominent features are described herein.

One aspect of this disclosure provides an apparatus and method for facilitating a search for a desired item. The apparatus may include a memory unit. The apparatus may further include a processor operatively coupled to the memory unit. The processor may be configured to receive a request to find the item, and broadcast the request. The processor may be further configured to receive responses to the broadcasted request, the responses indicating a finding of and/or an ability to provide the item and including a bid to sell the item, and provide purchase options and/or delivery options for the item to a source of the request based on the received responses. The processor may be further configured to receive, from the source of the request, a selection of a purchase option from among the purchase options provided to the source, and provide instructions to a provider of the selected purchase option based on the received selection. In related aspects, a method performing functions of the apparatus is also provided.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

While the internet has provided shoppers with more options than had been previously available (e.g., online shopping and auction sites) and alternatives to visiting brick and mortar stores, shoppers may still have to spend their time visiting multiple stores or online sites, particularly for unique or hard-to-find items. To overcome such issues, this disclosure describes improvements below. In this disclosure, the following described methods and approaches below can be used solely or in any combination.

Described herein is a Seek-Find-Deliver Service (SFDS) for finding unique or ordinary items desired by a requester of a desired item, including virtual items, finding the best value for the item, and facilitating payments/transactions to obtain the item. In related aspects, the SFDS technique may keep the requester of the given item anonymous to the provider if so desired. In further related aspects, in certain implementations, the deliver/shipping feature of the SFDS technique may be optional, such that the SFDS technique includes the seek-and-find features without the delivery/shipping features.

For example, a requester or user of the SFDS may access a portal or application via local or remote computing device (s), and then identify or describe an item they wish to obtain, such as a product or service. In some instances, the portal may be a kiosk or other computing device designed for use with SFDS. For example, the portal may be situated in a post office or other location and may be suitable for performing a variety of functions, including, without limitation: receiving SFDS requests; verifying identities of SFDS requesters and/or authorized providers; matching providers to requesters; printing unique SFDS barcodes or other labels; printing receipts; and receiving payment. In an exemplary embodiment, a requester may use a portal to provide identifying information, such as a model number, a textual description, specifications, a photograph, drawing, description, other desired characteristics, and the like, and/or submit a request for an item. The portal may receive payment from the user via a user interface and print or electronically send a receipt to the user with a unique computer readable code, such as a barcode, a Quick Response (QR) code, or the like, or other identifying information to allow the user to track the request. In another exemplary embodiment, a provider may use a portal to respond to requests and/or receive documents and/or other materials for fulfilling a request. For example, a provider may access a portal to search for requests that the provider would like to respond to. The portal may display requests in anonymized form (e.g., without identifying the source of the request). In some instances, the portal may request identifying information from the provider to determine which requests the provider may have access to. After the provider has been approved to respond to a request, the portal may print and/or electronically send a unique identifier for use in sending the requested item.

The requester may input various descriptors about the item, as well as a maximum price they are willing to pay for the item. The requested item may be a unique, difficult-to-find item or an ordinary, readily-available item. It is noted that a requester may use the SFDS for an ordinary item to obtain multiple bids from multiple providers, and thereby identify the lowest market price for the item. In related aspects, the requester may limit the number of potential providers of the item by including various criteria, such as, for example, geographic/location limitations, previous experience of the provider, a respond-no-later-than date, etc. In some embodiments, the SFDS and/or the requester may set a limit on the number of responses that will be presented to the requester (e.g., the first ten responses, the first thirty responses, or some other predefined number/limit), such that the SFDS service does not become overloaded with too many responses.

The request may be broadcast to other entities, such as, for example, suppliers, vendors, distributors, and/or manufacturers of the item, as well as search service providers, middlemen, and/or the like. In one implementation, the request for the item may be posted in a forum, open or closed, such that the other entities may search for and offer to supply the item to the requester, such as, for example, by submitting proposals or responses to the request.

The requester may purchase the item via a payment portal and optionally pay for the postage/shipping to have the item transmitted to the delivery point of the requester from a provider entity. This may involve production of a label with a unique identifying barcode, or similar identifier, for the transmission or shipping of the item to the delivery point (e.g., household address, P.O. Box, virtual P.O. Box, etc.), with or without the provider of the item and/or the SFDS service knowing details indicative of the source of the request, such as, for example, an identity of the requester and/or the delivery point for the requested item. In related aspects, identity of the requester may be withheld from the provider by generating anonymized information based on removing elements indicative of the source of the request, and broadcasting the anonymized information. In some instances, anonymized information may be generated through use of a hash function. For example, a user may input identifying information to a portal and the portal may apply a hash function to the inputted information to produce a hash index (i.e., anonymized information) that is unique to the user but does not identify the user. The hash function may be any calculation that sufficiently masks the user's identity. In this example, the hash function may be used to reverse the process and determine the user from the anonymized information. When a user's request has been matched to a provider, the portal may supply the hash index to the provider. However, the provider may not have access to the hash function and thus may not be able to determine the identity of the user from the hash index. When the provider sends the item for delivery, the Post Office or other delivery service may have access to the hash function and can identify the user based on the hash index provided by the provider.

The service technique described herein changes the dynamic from a scenario where the requester has to research and cost-compare sources of the item to a scenario where the requester is offered the product from multiple providers or sources without having to allocate his/her time, efforts, and/or resources to locating the item from various sources (e.g., to find the best price). Not only does this save the requester time, the resulting competition among potential providers of the item may fuel pricing competition as the providers submit their responses to the request. Moreover, improved anonymity may be provided to the requester via the SFDS system/apparatus since the requester does not need to communicate directly with the providers, thereby greatly reducing or removing the possibility of the provider obtaining the IP address or other potentially identifying information about the requester.

Figure 1:
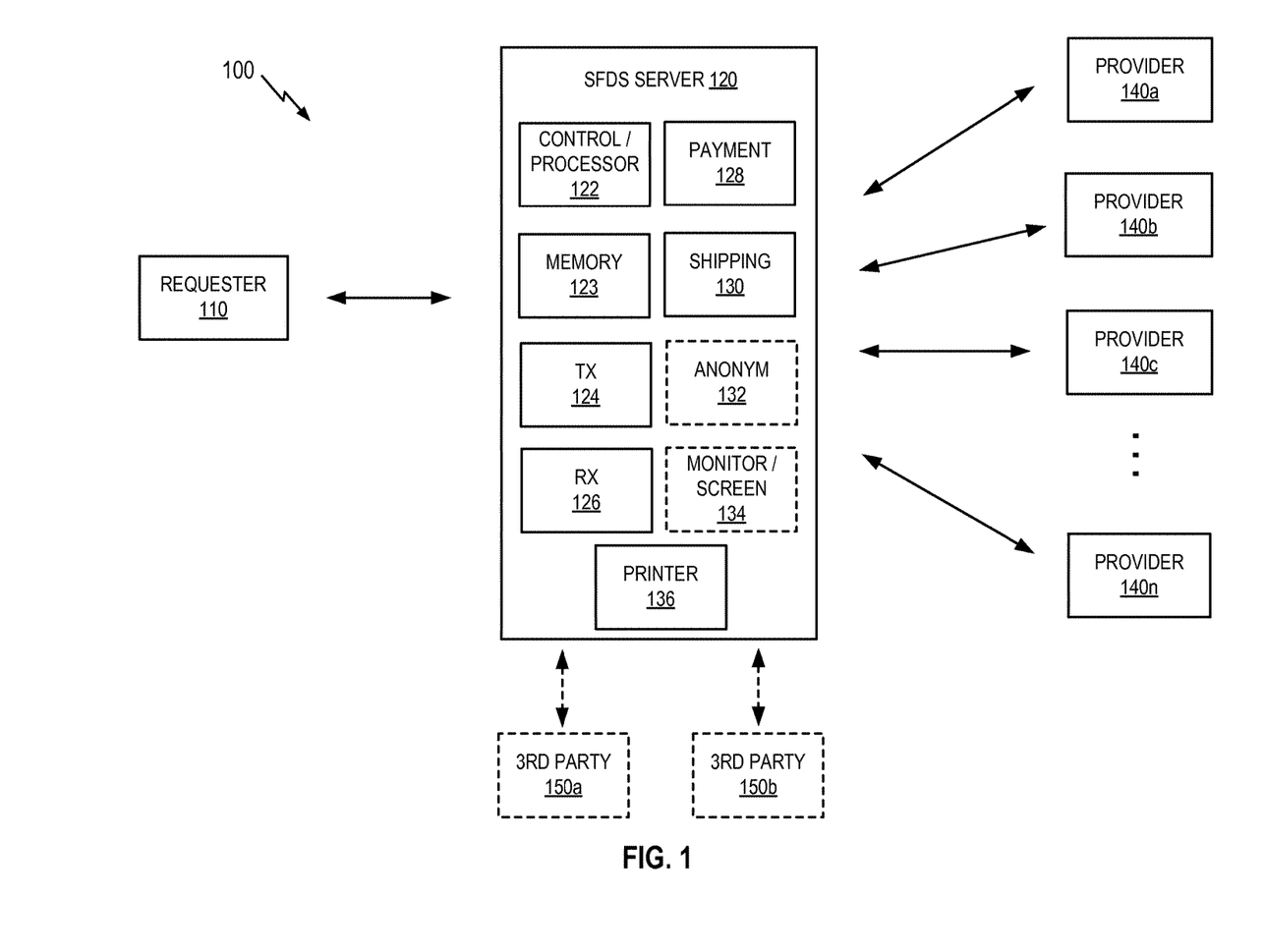
FIG. 1 is a block diagram of an exemplary system for a Seek-Find-Deliver Service (SFDS).
Figure 2:
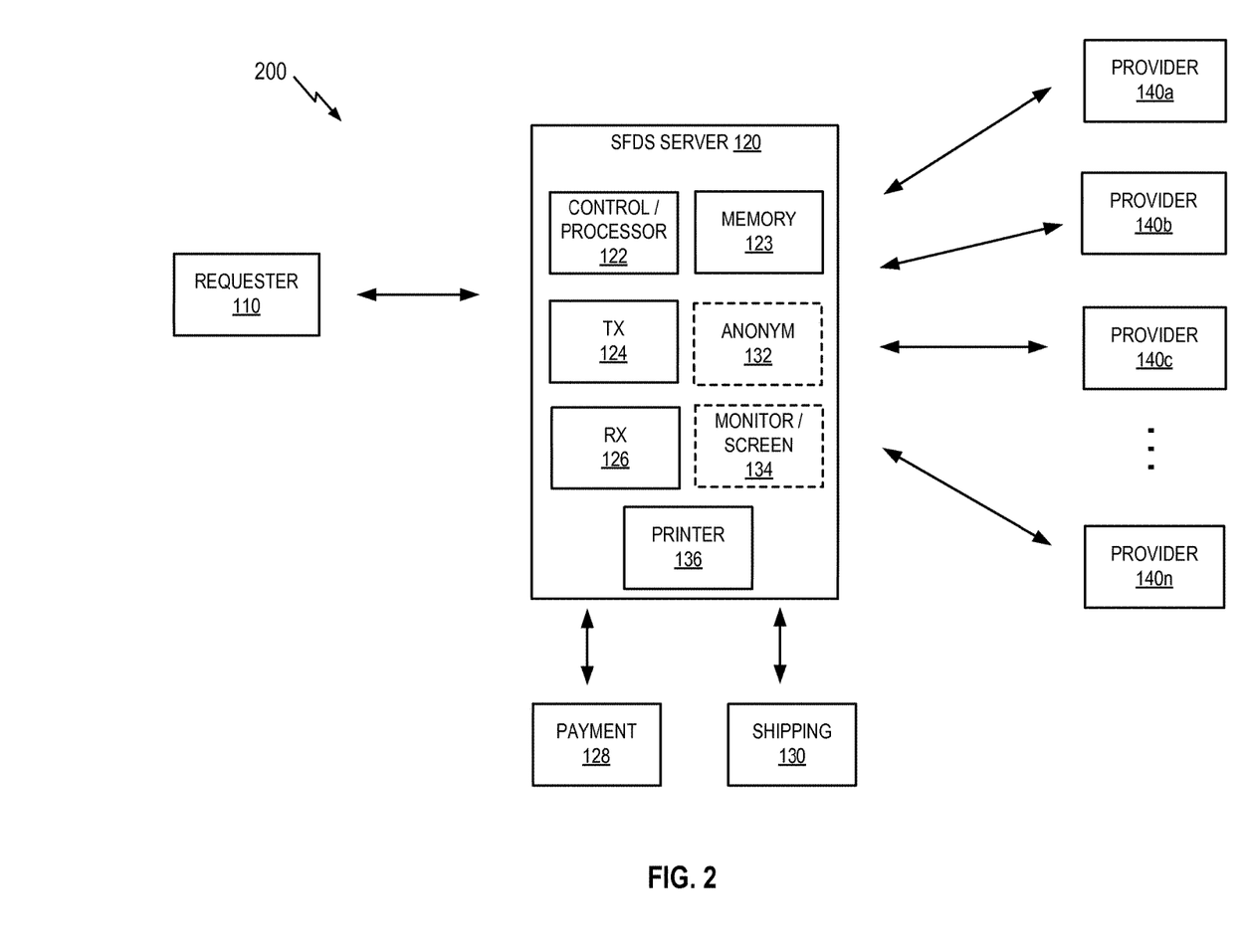
FIG. 2 is a block diagram of another exemplary system for SFDS.

FIG. 1 is a block diagram of an embodiment of a system 100 that may implement one or more aspects of the SFDS techniques described herein. The system 100 may include a requester entity or request source 110 in communication with an SFDS server 120 or the like, or in communication with a plurality of servers 120, although one server is illustrated in FIGS. 1-2 for simplicity. The server 120 may be communication with one or more potential provider entities 140*a-n* of the item (e.g., suppliers, vendors, manufacturers, middlemen, etc.).

In related aspects, the requester 110 may communicate with the server 120 via a local area network (LAN) or a wide area network (WAN), such as, for example, the internet. For example, the requester 110 may communicate with the server 120 via a website or a mobile app, or via a kiosk at a SFDS service center or postal service facility. In another example, the requester 110 may communicate with the SFDS via telephone or mail. An entity at an SFDS site may receive information from the requester 110 and input the received information into the SFDS server 120 or the like. The entity at the SFDS site may be a customer service representative or employee of the SFDS. In the alternative, or in addition, the entity may utilize or include voice recording/transcription device (for phone calls) and/or optical character recognition (OCR) device, or the like.

In further related aspects, the server 120, or components thereof, may receive a request to find and/or provide a desired item from the requester 110, and in turn broadcast the request to the providers 140*a-n*. The server 120 may receive responses to the broadcasted request from one or more of the providers 140*a-n*, each response indicating a finding of and/or an ability to provide the item and including a bid to sell the item. For example, the server 120 may broadcast the request by posting the request on a website accessible by the providers 140*a-n*. In another example, the server 120 may communicate directly with one or more of the providers 140*a-n*.

The server 120 may receive responses to the broadcasted request from one or more of the providers 140*a-n*, the responses indicating a finding of or an ability to provide the item and including a bid to sell the item. The server 120 may provide delivery options for the item to a source of the request (i.e., the requester 110) based on the received responses. The server 120 may receive, from the requester 110, a selection of a delivery option from among the delivery options provided to the requester 110, and may provide instructions to a provider (e.g., a selected one of the providers 140*a-n*) of the selected delivery option based on the received selection. In some embodiments, the delivery options may include a method of delivery, a time of delivery, an a request for an anonymous transaction, a delivery entity, and/or purchase options, as described elsewhere herein.

In some embodiments, a bid from a provider may include a variety of information, including, without limitation: an offered price; an estimated delivery date; a condition of the item; and a compensation to be provided if the item is unsatisfactory. In a related aspect, a provider's bid may also include information about the provider, such as the provider's company name and reliability information. For example, when a provider bids to provide an item, information about the provider's reliability on previous bids may be provided along with the bid. In some aspects, to maintain provider anonymity, a portal may not show a requester all information that the portal has received about the provider. In some of these aspects, the portal may use such information to create a score for the provider that can be shown to the requester without disclosing the provider's identity. For example, if a provider works for XYZ Company, the portal may show the requester a score regarding what percentage of bids from XYZ company result in a successful delivery, but does not disclose that the bid is from XYZ Company. In another example, if a provider is located in Los Angeles, but prefers the location to remain anonymous, the provider may calculate a score, from 1 to 10, or provide time estimates of shipping, to show to the requester to indicate how far the item would have to travel to arrive at the requester. In a related aspect, a portal may perform calculations on information from the provider to generate an overall score for the provider for a particular request, thus creating a sortable list for the requester to review. In some of these aspects, if a provider's score is below a given threshold, the provider's bid may not be shown to the requester.

In yet further related aspects, the server 120 may include a processor or controller 122 in operative communication with a transmitter unit 124 and a receiver unit 126, which facilitate wired or wireless communication with the other entities in the system 100, including but not limited to the requester 110, the providers 140*a-n*, and optional third-party entities 150*a-b*, over one or more communication networks. The processor 122 may be in operative communication with a memory unit 123 with instructions for coordinating the SFDS operations, including, for example, the methodologies described below with reference to FIGS. 3-7.

In still further related aspects, the server 120 may include a payment processing module 128 for processing payments by the requester 110 and/or the provider 140. The payment processing module 128 may optionally store information about an escrow account for the transaction between the parties, and may optionally operate in conjunction with a third-party entity 150 to process payments and coordinate the transfer of funds by the parties.

The server 120 may include a shipping processing module 130 for generating bar codes or the like associated with the transactions and/or generating shipping labels with such bar codes. The server 120 may optionally operate in conjunction with a third-party entity 150 to handle the shipping of the desired item from a provider 140 to the requester 110. In some embodiments, the server 120 may be associated with a printer 136 for printing bar codes and/or other identifying information.

It is noted that the SFDS server 120 may perform the payment processing, shipping processing, as well as other features, alone or in conjunction with other server(s) 120. For example, the server(s) may be operated by a postal service entity, a courier service entity, a shipment service entity, etc. It is also noted that the server 120 may operate in conjunction with one or more third-party entities 150*a-b* to perform one or more of the features that would otherwise be performed by the payment processing module 128, the shipping processing module 130, etc.

In related aspects, the server 120 may optionally include an optional transaction data anonymizer 132 for protecting the identities of the requester 110 and/or the provider 140. That is, the anonymizer 132 may generate anonymized information based on removing elements indicative of the source of the request and/or the response to the request or by applying a hash function to the request. In one aspect, the anonymizer 132, alone or in conjunction with the processor 122, is configured to detect and remove data in the request for the item that reveals the identity of the source or a delivery point for the item, such as, for example, names, email addresses, user IDs, social networking information, user device fingerprints, Internet Protocol (IP addresses), mailing address information (e.g., street, city, county, state, and zip code), phone numbers, area codes, or the like. In another aspect, the anonymizer 132 and/or the processor 122 encrypts or otherwise encodes some or all of such detected data in such a way that only authorized parties (e.g., the SFDS provider) can decode and read the encrypted data. In yet another aspect, the anonymizer 132 and/or the processor 122 assigns a unique identifier to the transaction between the request source and item provider, wherein the unique identifier is randomly generated or created based on a cryptographic hash function performed on one or more of the data provided by the request source or the item provider. In still another aspect, the anonymizer 132 and/or the processor 122 extracts a subset of the received information regarding the item, the extracted subset not indicative of an identity of the source, and supplements the extracted subset with other transaction data not indicative of the identity of the source (e.g., data and time).

It is noted that one or more of the features of the SFDS technique described herein may be performed by the processor 122 alone or in conjunction with the payment processing module 128, the shipping processing module 130, and/or the transaction data anonymizer 132. Similarly, the one or more of the features of the SFDS technique described herein may be performed by the payment processing module 128, the shipping processing module 130, and/or the transaction data anonymizer 132, separately or in conjunction with the processor 122. It is further noted that the components/modules of the server 120 may optionally communicate and operate in conjunction with one or more third-party entities (e.g., entities 150*a-b*) to perform one or more of the features of the SFDS technique described herein.

It is also noted that the server 120 may include an optional monitoring/screening module 134 to ensure that the SFDS service is safe and not used to engage in illegal activities. In related aspects, the SFDS service may have the suppliers, vendors, etc. go through the process of registering, and identifying themselves before they can qualify as providers 140a-n. For example, the monitoring/screening module 134 may provide authentication and screening of potential providers (e.g., background checks or the like). If the given entity passes the screening and is registered, the given entity may be authorized to participate as a provider 140 under the SFDS service. Similarly, the monitoring/screening module 134 may screen the requester 110 and have the requester 110 register before utilizing the SFDS service. In further related aspects, the monitoring/screening module 134 may optionally monitor the activities of the requester 110 and the providers 140a-n to prevent the use of the SFDS service to purchase illegal items (e.g., street drugs) or otherwise engage in illegal activity.

The controller 122, alone or in conjunction with the optional monitoring/screening module 134, may be configured to collect and store information about the requester 110 and/or the providers 140a-n in the memory 123. This way, the requester 110 and/or the providers 140a-n do not have to repeatedly input the same data. In one aspect, the information about the requester 110 and/or the providers 140a-n is collected and stored during the screening and/or registration process performed by the monitoring/screening module 134. In another aspect, the controller 122 and/or the monitoring/screening module 134 may be configured to provide a graphical user interface (GUI) to the requester 110 and/or the providers 140a-n to allow the parties to create a user id and password create an SFDS account. Information about the registered parties may be securely stored in the memory 123 of the server 120 and/or other servers operated by an SFDS entity, its affiliates, or other third parties. In yet another aspect, the controller 122 and/or the monitoring/screening module 134 may be configured to give the requester 110 and/or the providers 140a-n the option to opt-in to having their respective information stored by the SFDS entity, its affiliates, or other third parties. This way, the storage of information about the requester 110 and the providers 140a-n would be at the option of the requester 110 and the providers 140a-n, respectively.

In further related aspects, FIG. 1 shows a system 100 wherein the payment processing module 128, the shipping processing module 130, and the transaction data anonymizer 132 are part of the server 120. It is noted, however, that one or more of the functions performed by the modules/components of the server 120 in FIG. 1 may be performed by one or more entities that are external or separate from the server 120, and that may be in communication with the server 120 or components thereof. For example, FIG. 2 shows an example system 200 having a payment processing entity 210 and a shipping processing entity 220 that are separate from but operative in conjunction with the server 120. The other entities and features of the system 200 are more or less the same as the system 100 of FIG. 1.

In still further related aspects, the SFDS service or portions thereof may be facilitated through a postal service and/or in partnership with one or more external sites or service providers. In further related aspects, the value to the service user or requester 110 is that they simply have to send a request for the desired item, while the provider(s) 140 spend the time and put forth the effort to locate the item. In still further related aspects, the SFDS service may broadcast the request to a wider network of potential providers 140, including providers that requester does not know of, who in turn may communicate with additional potential providers or suppliers of the item. Not only does this increase the probability of finding the item, it may also result in pricing-competition among the providers 140, which may drive down the price/cost of the item for the requester 110.

In one illustrative example, a shopper 110 may wish to buy a unique or specific item, such as, for example a gold-plated Santa Claus figurine. Typically, the shopper 110 would search many different sites and/or stores trying to find the item, as well as the best value for the item if found. Even when the shopper 110 does find the item, and even when the shopper 110 compares pricing or uses sites that compare the pricing, the shopper 110 may still wonder if he/she has considered all of the potential providers 140a-n of the item and whether he/she is getting the best value. With one implementation of the SFDS techniques described herein, the shopper 110 may simply go to a SFDS website or use an SFDS app on their personal computing device to submit their request, such as, for example, by posting that they want to buy the item, e.g., the gold-plated Santa Claus figurine. The shopper 110 may provide descriptors or criteria, such as, for example, that the figurine must be at least 16-18 inches in height, must be in excellent condition, etc. The shopper 110 may indicate a price that he/she is willing to pay for the item. Such information may be posted via the website or app, and be available to the providers 140a-n (e.g., all available providers or a subset of the providers based on the criteria submitted by the shopper/requester). The information that is broadcast or posted for access by the providers 140a-n may be anonymized (e.g., by the anonymizer 132 or the like) to remove elements indicative of the source of the request for the figurine or the requester's identity.

In related aspects, the requester may visit a SFDS website or the like to register for the SFDS service. The SFDS website may optionally invoke an identity verification process in order to know that the person registering as the requester is the actual person. Such a process may include registration with a credit card or other payment information to setup the account with a service provider, such as, for example, a postal service entity or the like.

In further related aspects, various entities in the general public, such as suppliers and/or middlemen (collectively referred to herein as providers), may see the request for the gold-plated Santa Claus, and may look for this item. When a provider 140 finds and/or creates the item or determines that the item matches product(s) in inventory, the provider 140 may submit an online response via the SFDS system, thereby indirectly to the requester 110 of the gold-plated Santa Claus. The response comprises an offer and may include a product description, a picture, and pricing. The pricing may be open or closed, meaning that other providers can see the pricing (if the pricing is open) and offer more competitive pricing. If the requester 110 decides on or selects a particular item from a particular provider, he/she may accept the offer and request the item be mailed to a destination point, such as, for example, by the postal service or the like.

For example, the provider 140 may print out a postage/mailing label, generated through a postal service site or the like (e.g., by the shipping processing module 130 or the shipping processing entity 220), and then apply the label to the package with the item. The label may include an identifier, such as, for example, an Intelligent Mail Package barcode (IMpb), an Intelligent Mail barcode (IMb), or the like (depending on what is being sent) for tracking of the item by the SFDS service (collectively referred to herein as SFDS types of barcodes). The identifier may include or otherwise be cross-referenced with a service type ID. The use of such identifiers or barcodes facilitates maintaining the anonymity of the requester(s) 110 and/or provider(s) 140 of item(s) processed by the SFDS system (e.g., system 100 or 200 or variations thereof).

In some aspects, barcodes may be any representations of data for use in facilitating transfer of goods and/or information in accordance with embodiments of the present disclosure. For example, a barcode may be a physical representation of data printed on paper or an object and may be readable by a machine or other reader. In an alternative example, a barcode or other computer readable code may be a virtual representation of data which may be displayed, for example, on a computer screen and may be readable by a machine or other reader. In an embodiment, a barcode may facilitate maintaining anonymity of a user by providing a coded representation of data. A barcode or other computer readable code may be created through use of a hash function or other computation to create a representation of data that may not be readable without using the particular hash function or computation used to create it.

In related aspects, a label may have more than one computer readable code thereon, and each barcode may convey different information. For example, a requester's address may be communicated by one computer readable code, the requester's name may be communicated by a second computer readable code, and an address of a shipping facility may be a third computer readable code. In this example, each computer readable code may be readable by a single t type of machine, or reader. In some embodiments, the computer readable codes may be of different types, requiring different machines or readers to read the information encoded therein. In a related aspect, a single computer readable code may convey a different amount of information based on a specific machine or reader used. For example, a particular reader may be suitable for interpreting a portion of a computer readable code but not the entire computer readable code. In this way, levels of exclusivity may be created regarding requester and/or provider information to maintain each user's anonymity.

For example, when the postal service encounters an SFDS type of barcode on the label of the package (containing the desired item) from the provider 140, the item may be identified based on the labeling, regardless of whether the labeling has an address printed on it. The information encoded within or cross-referenced with the barcode may be sent to a printer or to a work station, which may then print a name and address label that may be applied to the package for routing and delivery to the requester. In this example, a distribution network, such as a postal or delivery service may have access to the hash function or computation needed to determine the identifying information of the requester (e.g., a reader designed to decode the barcode on the package), but the provider would not have access to the hash function.

In yet further related aspects, the SFDS type of barcode may encode or otherwise be cross-referenced with the routing ZIP code (e.g., a 5 digit ZIP code), so the package or mail-piece with the label may get to its final destination via a postal service, a courier service, a shipment service, etc. For example, when a post service employee scans the barcode, a label may be generated and added to the mail-piece, which will facilitate delivery to the destination.

In other related aspects, a virtual label or identifier may be used for transferring virtual data. For example, a requester may request a virtual item, such as a short story in electronic form. A provider may view the anonymized request through use of a portal and make a bid using the portal. If the requester selects the provider to provide the item, the portal may provide an anonymous e-mail address and/or a unique virtual label to the provider. The provider may access or create the short story and send it to the electronic address with or without a label. In some instances, a virtual label may be attached to an electronic item or the electronic item may be attached to the label. In a non-limiting example, the provider may send an electronic document via e-mail to the postal service or other recipient and the e-mail may have a unique label or identifier as an attachment. The label may include a machine-readable barcode (e.g., using a physical barcode reader) to allow the recipient to forward the electronic document to the requester.

In related aspects, payment to the provider 140 may be deferred as follows. When recipient requester 110 gets the particular package, he/she may verify that the received item is in fact the desired or requested item. If the requester 110 is satisfied with the received item, and notifies the SFDS system (e.g., via a website, a mobile app, or phone call), the SFDS system may generate a release of the payment for the item that has been held in an escrow account or the like. When the payment funds are released from escrow account, the payment information may be sent to the provider 140 via a secure hash algorithm (SHA) or the like (e.g., performed by the anonymizer 132 and/or the processor 122 as described above), such that the requester 110 and the provider 140 may remain anonymous to each other.

If there is a delay of payment to the provider 140 or if the item is not acceptable to the requester 110, then the requester 110 may utilize the SFDS system to generate another label and return the item to the sender, via the SFDS intermediary system, and may optionally pay the postage for returning the item, depending on the terms of the agreement between the parties. It is noted that the parties may negotiate and memorialize the terms of the agreement via the SFDS system. For example, the parties may propose, accept, reject, or modify the terms of the agreement, via the SFDS system, during the request and response stages of the transaction or during any point during pendency of the transaction. For example, if a dispute arises between the requester 110 and the provider 140 (e.g., due to failure to pay for the item or fraudulent activity by one of the parties), an inspection service entity and/or an enforcement entity may investigate and resolve the dispute between the requester 110 and the provider 140. In one example, the inspection service entity and/or the enforcement entity may be part of or otherwise affiliated with the SFDS service provider, such as a postal service entity, a courier service entity, a shipment service entity, etc. In another example, the inspection service entity and/or the enforcement entity may be independent of or unaffiliated with the SFDS service provider.

Accordingly, benefits of the SFDS service may include, but are not limited to, non-disclosure of the identifies of the requester 110 and/or the provider 140, as well as the ability to post a narrative/description regarding a desired item and to have the description go to an audience (e.g., the general community), who in turn may facilitate or themselves engage in seeking and finding the item. The SFDS service may present numerous options to the requester 110 for purchasing the item, along with pricing and background information, images, etc. This in turn saves the requester 110 from having to spend his/her time looking for the item and conducting a price-comparison for the item. Instead, the burden of finding an item and obtaining pricing information for the item is shifted away for the requester 110 or prospective buyer, and shifted toward the provider(s) 140 (e.g., supplier, vendor, manufacturer, middleman, etc.) in the general community.

In view of exemplary systems shown and described herein, methodologies that may be implemented in accordance with the disclosed subject matter will be better appreciated with reference to various flow charts (discussed below). While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 3:
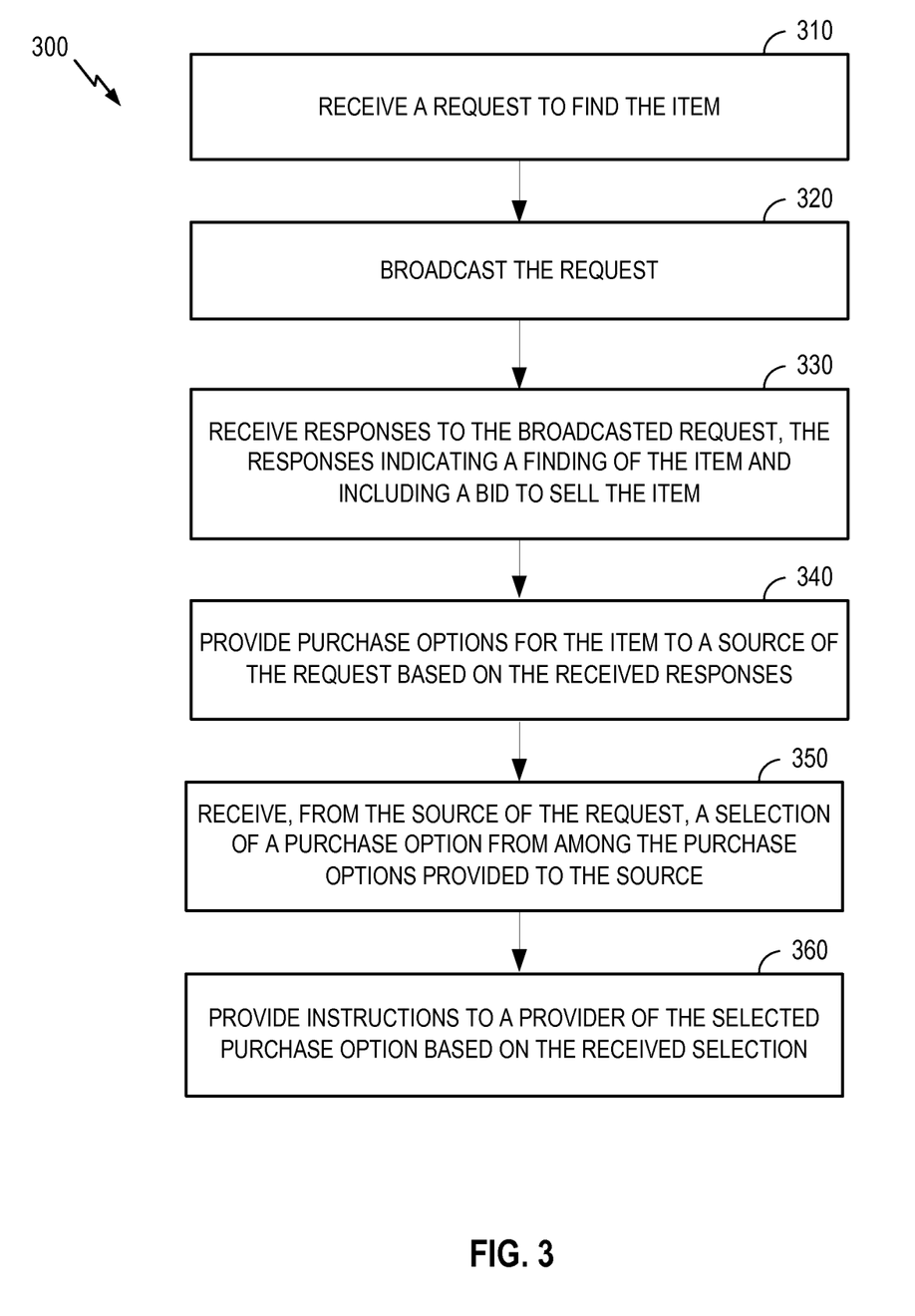
FIG. 3 is a flow chart showing an exemplary method for facilitating a search for a desired item, in accordance with one or more aspects of this disclosure.

FIG. 3 is a flow chart illustrating a method 300 for facilitating a search for a desired item. The steps illustrated in FIG. 3 may be performed by an SFDS apparatus or the like, such as, for example, an SFDS server (e.g., the server 120 in FIGS. 1-2 or component(s) thereof). In one approach, the method 300 moves to block 310 and receives a request to find the item. The method 300 then moves to block 320 and broadcasts the request. The method 300 then moves to block 330 and receives responses to the broadcasted request, the responses indicating a finding of and/or an ability to provide the item and including a bid to sell the item. The method 300 then moves to block 340 and provides purchase options for the item to a source of the request based on the received responses. The method 300 then moves to block 350 and receives, from the source of the request, a selection of a purchase option from among the purchase options provided to the source. The method 300 then moves to block 360 and provides instructions to a provider of the selected purchase option based on the received selection.

With reference to FIGS. 4-7, there are shown further operations or aspects of the method 300 that are optional and are not required to perform the method 300. If the method 300 includes at least one block of FIGS. 4-7, then the method 300 may terminate after the at least one block, without necessarily having to include any subsequent downstream block(s) that may be illustrated.

Figure 4:
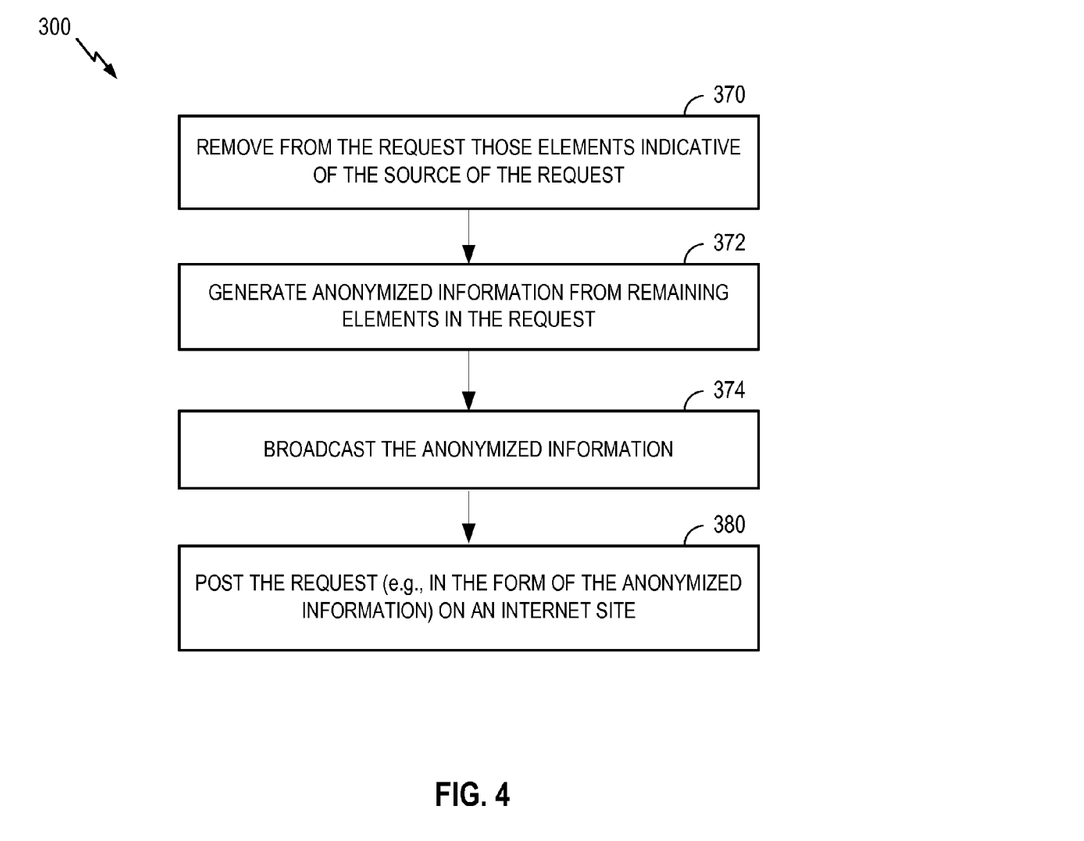
FIGS. 4-7 show further aspects of the exemplary method of FIG. 3.

With reference to FIG. 4, the method 300 includes broadcasting the request (block 320) by moving to block 370 and removing from the request those elements indicative of the source of the request, then moving to block 372 and generating anonymized information from remaining elements in the request, and then moving to block 374 and broadcasting the anonymized information. In other related aspects, the method 300 moves to block 380 and posts the request (e.g., in the form of the anonymized information) on an Internet site.

Figure 5:
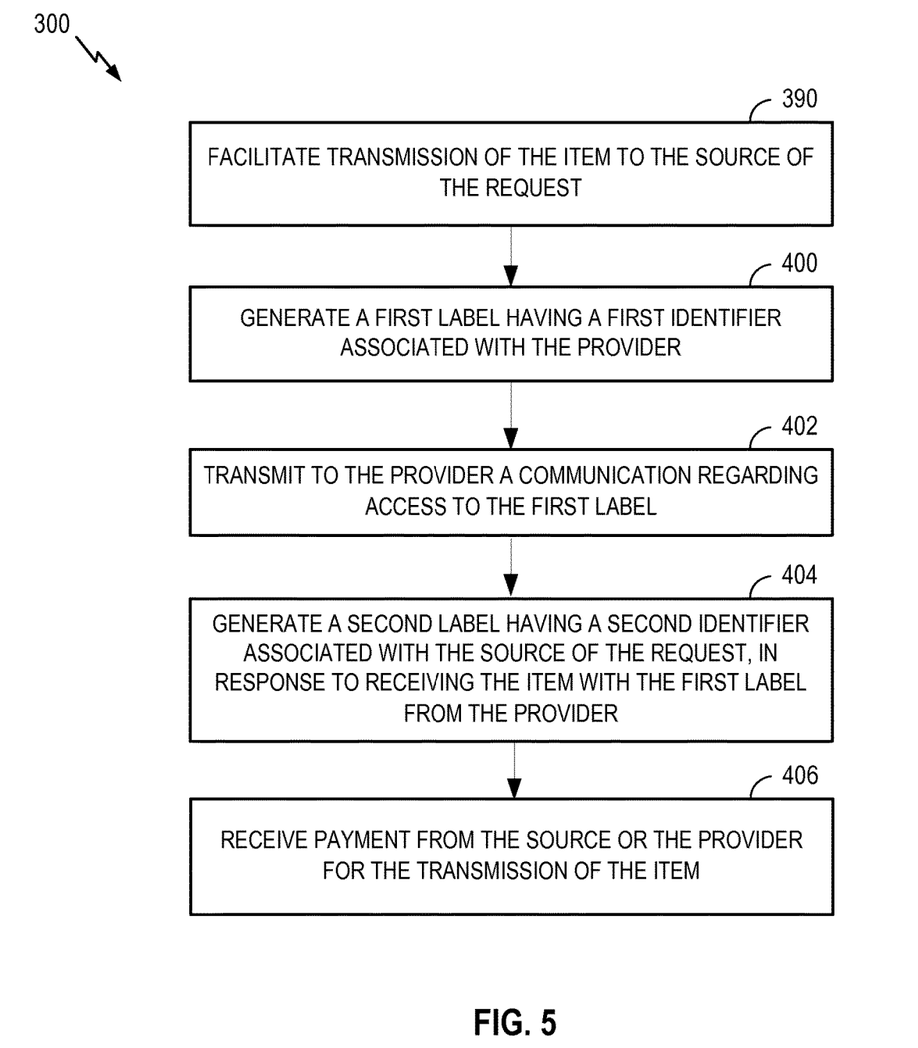

With reference to FIG. 5, the method 300 moves to block 390 and facilitates transmission of the item to the source of the request. In one example, the method 300 moves to block 400 and generates a first label having a first identifier associated with the provider, and then moves to block 402 and transmits to the provider a communication regarding access to the first label. The method 300 then moves to block 404 and generates a second label having a second identifier associated with the source of the request, in response to receiving the item with the first label from the provider. The method 300 then moves to block 406 and receives payment from the source or the provider for the transmission of the item.

Figure 6:
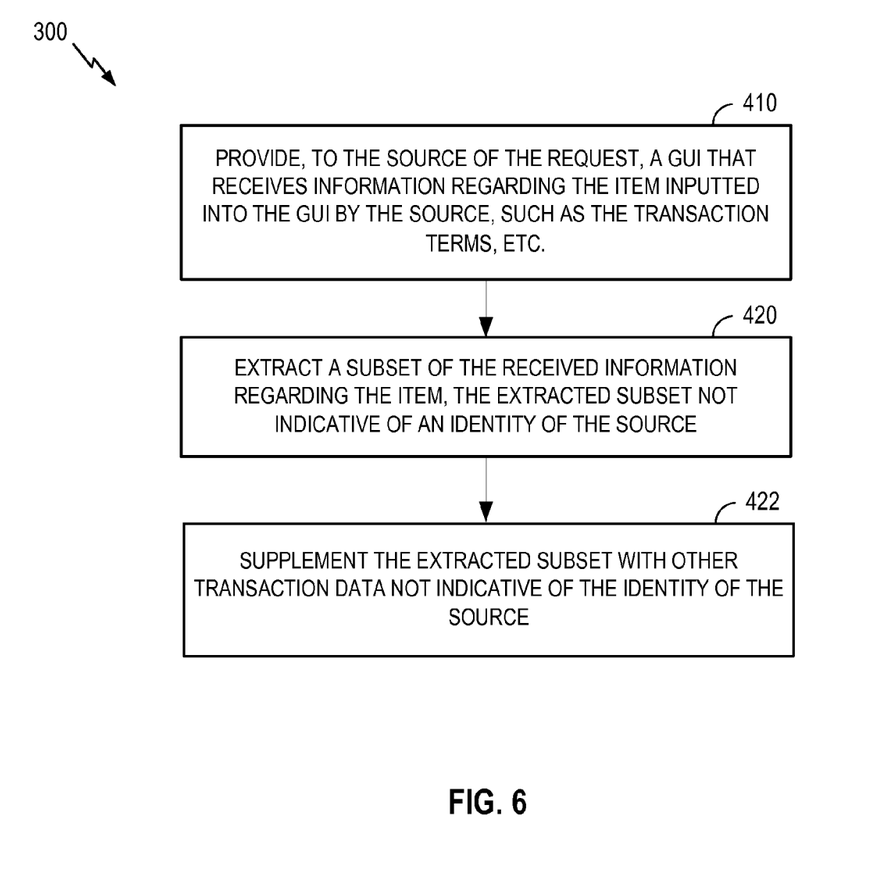

With reference to FIG. 6, the method 300 includes receiving the request (block 310) by moving to block 410 and providing, to the source of the request, a GUI that receives information regarding the item inputted into the GUI by the source, such as, for example, the transaction terms (e.g., the price the requester is willing to pay for the item), etc.

In related aspects, the method 300 moves to block 420 and extracts a subset of the received information regarding the item, the extracted subset not indicative of an identity of the source. The method 300 then moves to block 422 and supplements the extracted subset with other transaction data not indicative of the identity of the source.

Figure 7:
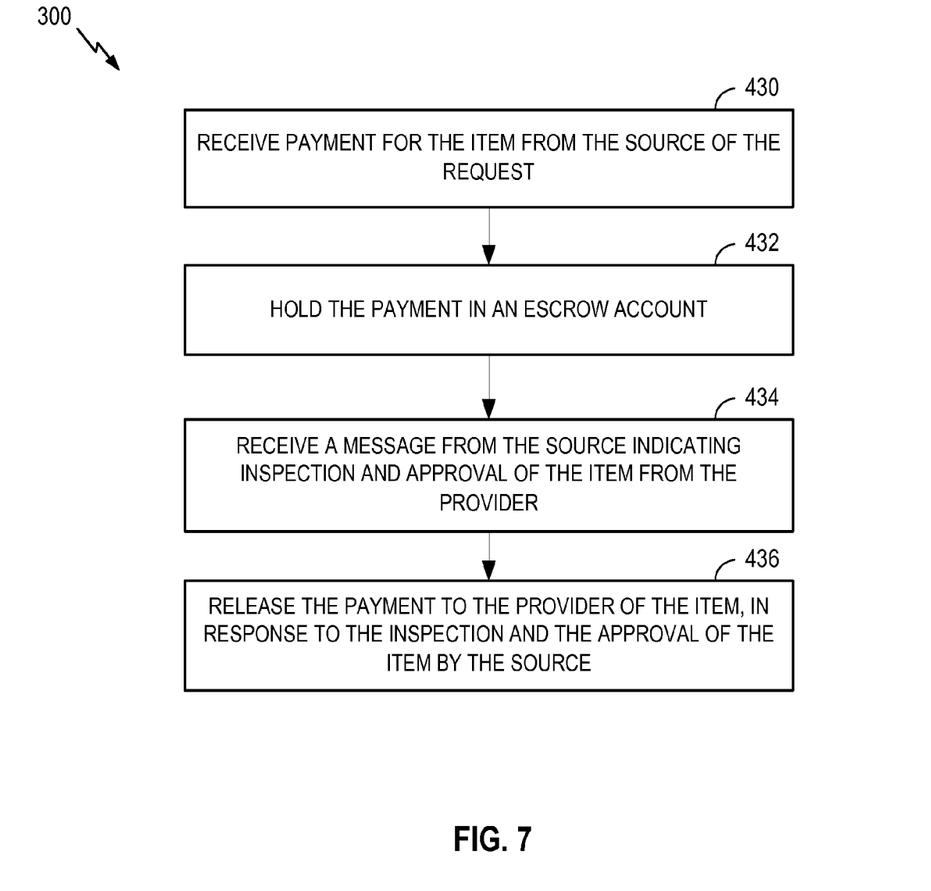

With reference to FIG. 7, the method 300 moves to block 430 and receives payment for the item from the source of the request, and then moves to block 432 and holds the payment in an escrow account or the like. The method 300 then moves to block 434 and receives a message from the source indicating inspection and approval of the item from the provider, and then moves to block 436 and releases the payment to the provider of the item, in response to the inspection and the approval of the item by the source.

It is noted that one or more processors of a server (e.g., the SFDS server 120 in FIGS. 1-2), or servers in a distributed network, may be configured to perform method 300, including but not limited to blocks 310-436, and variations thereof. With reference to the example systems 100, 200 shown in FIGS. 1-2, one or more processors 122 may operate in conjunction with a memory unit 123 (e.g. with stored instructions and/or data structures to be accessed by the one or more processors), a transceiver unit (or separate receiver unit 126 and transmitter unit 124 as shown in FIGS. 1-2), specialized components/modules (e.g., the payment processing module 128, the shipping processing module 130, and/or the transaction data anonymizer 132 in FIG. 1), and/or separate entities (e.g., the payment processing entity 210 and/or the shipping processing entity 220 in FIG. 2, as well as other third-party entities).

The foregoing description details certain embodiments of the systems, devices, and methods disclosed herein. It will be appreciated, however, that no matter how detailed the foregoing appears in text, the systems, devices, and methods can be practiced in numerous ways.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

What is claimed is:

1. A method for facilitating a search for a desired item, comprising:
    receiving, via a user interface, a request from a user to find an item, the request including information regarding the user and regarding the item;
    broadcasting, via a user interface, the request to a plurality of potential providers of the item;
    receiving, via a user interface, responses to the broadcasted request from providers of the item, the responses including information regarding the item, indicating an ability to provide the item and including a bid for providing the item to the user;
    providing, via a user interface, delivery options for the item to the user based on the received responses;
    receiving, via a user interface, from the user, a selection of a delivery option from among the delivery options provided to the user;
    providing, via a user interface, instructions to the provider of the selected delivery option based on the received selection;
    generating a first electronic delivery label including a first identifier, the first identifier including anonymized delivery information; and
    transmitting information indicative of the first electronic delivery label to the provider of the selected delivery option.

2. The method of claim 1, wherein broadcasting the request comprises::
    generating anonymized information, including removing elements of the information indicative of the user.

3. The method of claim 1, further comprising generating a second identifier associated with the user, in response to receiving the item with a label which includes the transmitted information associated with the first electronic label from the provider.

4. The method of claim 1, further comprising receiving payment from the user or the provider of the selected delivery option for the transmission of the item.

5. The method of claim 1, wherein, prior to receiving the request from the user, the method further comprises providing, to the user, a graphical user interface (GUI) that receives information regarding the item inputted into the GUI by the user.

6. The method of claim 1, further comprising:
    extracting a subset of the received information regarding the item, the extracted subset not indicative of an identity of the user; and
    supplementing the extracted subset with other transaction data not indicative of the identity of the user.

7. The method of claim 1, further comprising:
    receiving payment for the item from the user;
    holding the payment in an escrow account;
    receiving a message from the user indicating user inspection and approval of the item received by the user from the provider; and
    releasing the payment to the provider of the selected delivery option, in response to receipt of the message indicating the inspection and the approval of the item by the user.

8. The method of claim 1, further comprising:
    monitoring at least one of the received request or the received responses to detect an illegal activity; and
    suspending a transaction involving the at least one of the received request or the received responses, in response to detection of the illegal activity.

* * * * *